Aug. 12, 1969  E. S. BIRCH  3,460,431
TOOL FEEDING AND RELIEVING MEANS FOR GEAR FORMING MACHINE
Filed Oct. 20, 1967  2 Sheets-Sheet 1

INVENTOR.
Edward S. Birch
BY
Harness, Dickey & Pierce
ATTORNEYS.

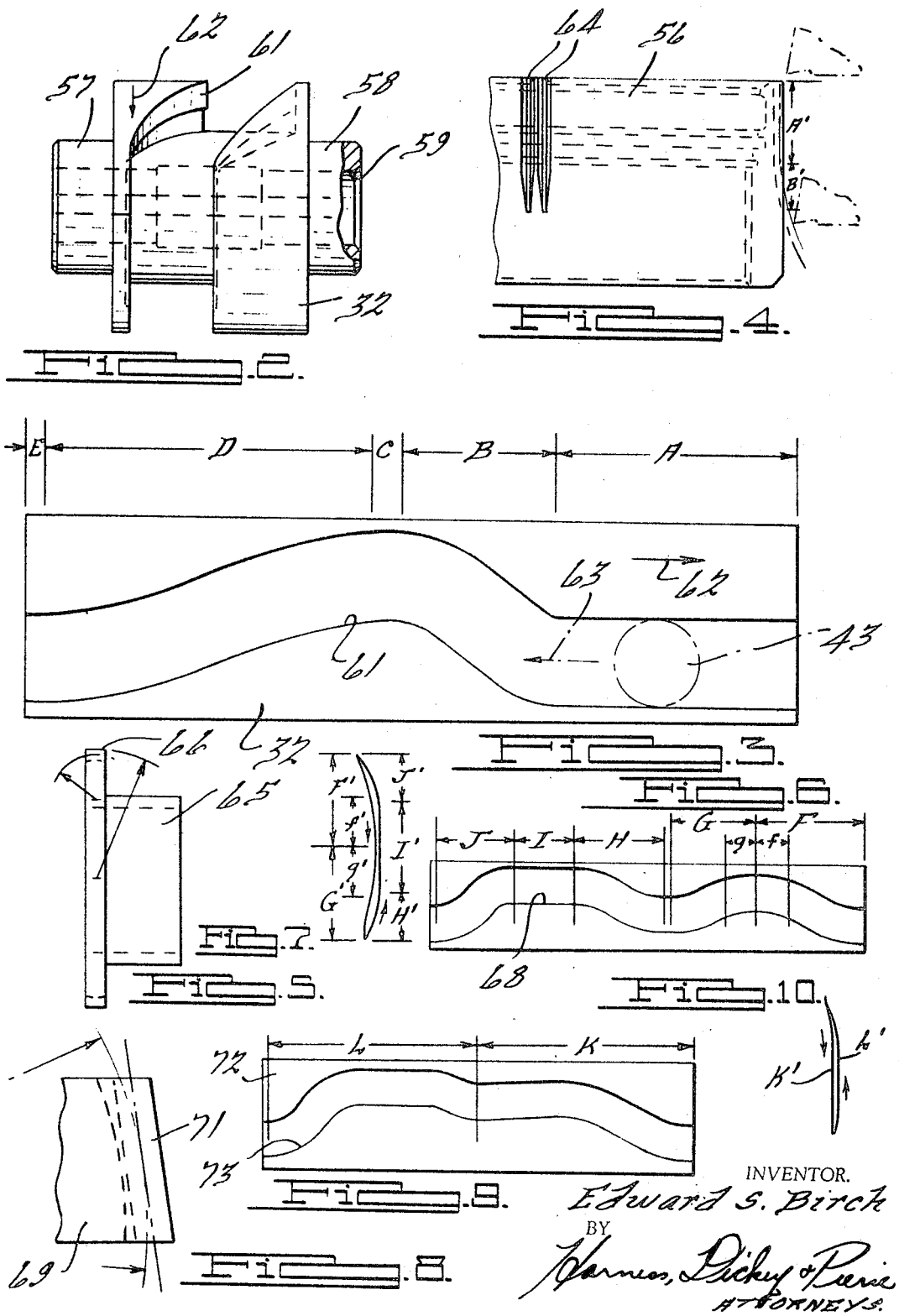

United States Patent Office 3,460,431
Patented Aug. 12, 1969

3,460,431
TOOL FEEDING AND RELIEVING MEANS FOR GEAR FORMING MACHINE
Edward S. Birch, Harper Woods, Mich., assignor to Michigan Tool Company, Detroit, Mich., a corporation of Michigan
Filed Oct. 20, 1967, Ser. No. 676,838
Int. Cl. B23f 9/04, 9/06
U.S. Cl. 90—10                                4 Claims

ABSTRACT OF THE DISCLOSURE

A gear forming machine having a vertically reciprocable workpiece and radially reciprocable cutting tools movable toward and away from the workpiece. A drum-like tool relief cam horizontally reciprocates a wedge which vertically reciprocates a feed cone and retractor ring for the cutting tool. The tool relief cam is so shaped that the cutting tools will be adjusted during the cutting stroke of the workpiece to create crowned, tapered or runout teeth.

BACKGROUND OF THE INVENTION

Field of the invention

The invention relates to feed mechanisms for gear forming machines of the type shown in Pelphrey Patent No. 2,469,310, issued May 3, 1949, for "Machine for Forming Gears." Machines of this type have a plurality of circumferentially disposed cutters which are fed radially with respect to an axially reciprocating gear blank to form all of the teeth on the gear simultaneously. The invention is particularly concerned with the formation of crowned, tapered or runout teeth.

Description of the prior art

It is known to have a drum-like tool relief cam for operating the feed mechanism of a gear forming machine of this type through the intermediary of a horizontally reciprocating tool relief wedge which moves the cutting tool feed cone and retractor ring. Such a feed mechanism is shown on pages 26 and 27 of the Manual of Operation for the Michigan Shear-Speed Shaper Line, issued by the assignee of the present application, Michigan Tool Company, Detroit, Mich. The tool relief cam in said prior art feed mechanism is so shaped as to hold the cutting tools in a cutting position for part of its rotation (while the ram and workpiece are traveling up for the cutting stroke) and to hold the tools in a relieved position while the ram is traveling down. This permits the cutting tools to form straight gear teeth which have no crowns, tapers or runout shapes.

SUMMARY OF THE INVENTION

According to the present invention, the drum-like tool relief cam has a novel and unique shape which, in conjunction with the other elements of the feed mechanism, will be capable of forming teeth which are crowned, tapered or have a runout. More particularly, the tool relief cam is so shaped that during the upward travel of the workpiece for the cutting stroke, the cutting tools will be radially adjusted so as to form the desired shape on the workpiece, whether it be crowned, tapered or runout shape.

BRIEF DESCRIPTION OF THE DRAWINGS

FIGURE 2 is a side elevational view, parts being broken away, of a tool relief cam for use in the present invention which is especially constructed for forming gears with runout teeth.

FIGURE 3 is a developed view of the surface of the cam of FIGURE 2.

FIGURE 4 is a partially schematic view of a portion of a gear with runout teeth and the adjacent portion of a tool for cutting such a gear as controlled by the cam of FIGURE 2.

FIGURE 5 is a side elevational view of a crowned tooth gear which may be formed with the present invention.

FIGURE 6 is a developed view of the surface of a drum cam for creating the workpiece of FIGURE 5.

FIGURE 7 shows the path of a tool tip relative to the workpiece of FIGURE 5.

FIGURE 8 is a fragmentary elevational view of a gear having tapered and crowned teeth which may be formed using the principles of the present invention.

FIGURE 9 is a developed view of a drum cam for creating the workpiece of FIGURE 7, and FIGURE 10 shows the path of a tool tip relative to the workpiece of FIGURE 9.

DESCRIPTION OF THE PREFERRED EMBODIMENT

Figure 1:
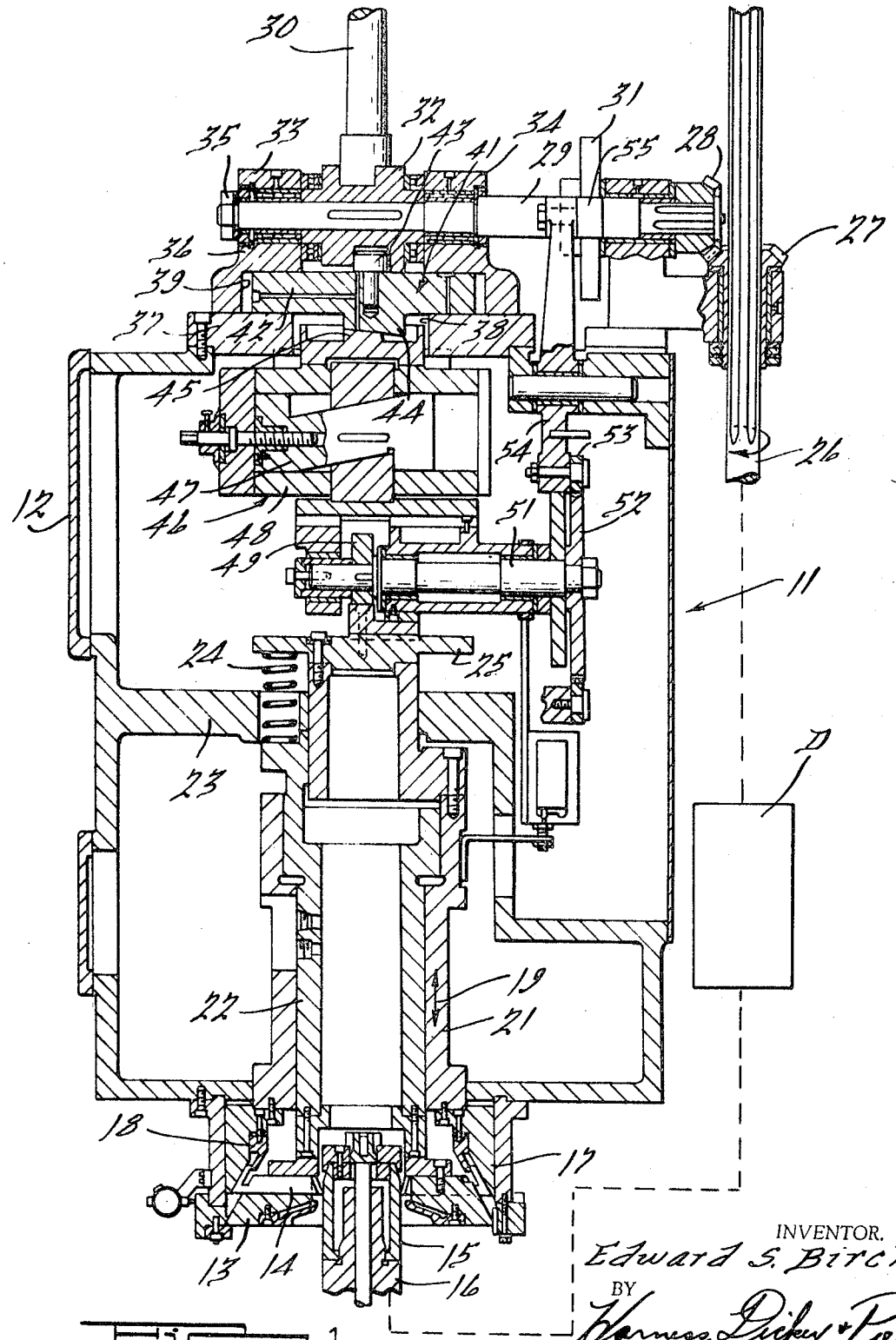
FIGURE 1 is a cross sectional view in elevation of a portion of a gear forming machine showing the novel feed mechanism.

The gear forming machine, generally indicated at 11, comprises a cutter head housing 12 which holds a cutter head 13 at its lower end. This head has a plurality of radially disposed cutters 14 which move in slots toward and away from the workpiece 15. The latter is secured to a ram 16 which reciprocates vertically, the cutters being moved inwardly just before the upward movement of the workpiece and being in retracted position during the downward movement thereof.

The means for moving the cutters in and out comprises a feed cone 17 and a cutter ring 18 which engage the outer ends of the tools, and are vertically reciprocated as indicated by the arrow 19 by a sleeve 21 within housing 12. Sleeve 21 is guided by an interior cylindrical member 22 secured to a wall 23 of housing 12. A plurality of circumferentially spaced springs 24 are disposed between the top of member 22 and a plate 25 secured to the upper end of sleeve 21; this spring force therefore will tend to retract the tools. The inward or advancing movement of the tools is accomplished by counteracting the forces of springs 24 as described in detail below.

Sleeve 21 is reciprocated one complete cycle for each complete upward and downward movement of workpiece 15. The feed drive comprises a vertical splined shaft 26 coupled to the gear power train in the base of the machine and carrying a bevel gear 27 which meshes with another bevel gear 28 on a horizontal cross shaft 29. The drive mechanism is indicated schematically at D in FIGURE 1 and interconnects shaft 26 with the driving means for reciprocating ram 16 so that they will operate in synchronism. It may be mentioned that the spline on shaft 26 is provided so that the entire cutter head housing may be moved vertically for loading and unloading workpieces by an actuator partially indicated at 30. Shaft 29 carries a ratchet feed cam 31, the purpose of which is described below, and also carries a generally drum-shaped tool relief cam 32. A pair of bearings 33 and 34 are carried by housing 12 and support shaft 29 on opposite sides of cam 32. A nut 35 is threaded on the left hand end of shaft 29 in FIGURE 1 to facilitate removal and replacement of cam 32 for reasons later described.

Bearings 33 and 34 have a common base 36 resting on a cover 37 for housing 12. This cover and base 36 have clearance openings 38 and 39 respectively for a tool relief wedge generally indicated at 41. This wedge has a plate portion 42 above which extends a roller cam follower 43 fitting into drum cam 42. A wedge portion 44 extends downwardly from plate 42 of the tool relief wedge, which is guided for horizontal reciprocating movement within the aforementioned clearance apertures.

Wedge 44 engages a complementary wedge 45 on a vertically movable head assembly generally indicated at 46 within housing 12. A Z-bar 47 is mounted in a housing 48 at the upper end of head assembly 46 and is used to adjust the cutting tool to the proper size in relation to the outside diameter of the workpiece. This adjustment is also required for repositioning the tools after sharpening. Housing 48 is located between wedge 43 and an infeed cam 49 carried by head assembly 46, and wedge 45 is mounted on the upper end of housing 48.

Infeed cam 49 adjusts the tool feed upon the completion of each cutting stroke and is mounted on a shaft 51 rotatably mounted on assembly 46 beneath housing 48. This shaft carries a ratchet 52 operated by a pawl 53, the pawl being mounted on arm 54 having a follower 55 at its upper end. Follower 55 engages ratchet feed cam 31. As ram 16 travels downwardly, the ratchet feed cam will rotate the ratchet wheel and infeed cam 49.

FIGURES 2 and 3 illustrate a particular cam 32 which is used to form runout gears such as that indicated at 56 in FIGURE 4. Such a gear has a first tooth portion A' of spur shape and a second or runout tooth portion B' with a decreasing depth along a radius. Cam 32 is of integral construction and has a pair of extensions 57 and 58 with a bore 59 for the reception of shaft 29. A main part of the cam has a groove 61, the shape of which is shown in the developed view of FIGURE 3. More particularly, as cam 32 rotates in the direction of the arrow 62 of FIGURES 2 and 3, follower 43 will move (relative to cam 32) in the direction of the arrow 63 of FIGURE 3.

The track has a dwell portion indicated at A in FIGURE 3, which is arcuate but has no component in the direction of the drum axis. This portion could occupy perhaps 110° of arc and positions wedge 44 relatively to the left in FIGURE 1, that is, so that sleeve 21 and its attached parts will be depressed. This will mean that tools 14 will be in a radially inward position so that as ram 16 rises the tools will cut straight sided portions of teeth 64 on workpiece 56. This will be in the area marked A' in FIGURE 4.

As cam 32 continues to rotate, follower 43 will enter the portion of the track marked B in FIGURE 3, having both arcuate and axial components. This is a curve which will cause wedge 44 to move progressively to the right (as seen in FIGURE 1) from the position it occupied when follower 43 was in portion A of the track. When wedge 44 moves to the right in FIGURE 1, springs 24 will cause lifting of sleeve 21 and its attached parts. The tool 14 will thus be withdrawn radially outwardly at a controlled rate as ram 16 continues to rise. It should be noted at this point that the drive for the ram (not shown) in this type of machine is a crank type of drive so that its upward velocity will not be constant. The curvature of track 61 will be so chosen as to be correlated with the speed of the ram in order to achieve the desired tooth curvature as shown in the area B' of FIGURE 4.

The portion of the track marked C in FIGURE 3 is a dwell portion during which the tools will remain in a constant position, and the area marked D is a return portion during which wedge 44 will be moved to the left in FIGURE 1 in order to advance tools 14 to their radially inward position ready for another cut. This advancing movement will occur while ram 16 and its attached workpiece are retracted downwardly, and the track will be so shaped as to insure that tools 14 will not interfere with the downward retraction of the workpiece. At this time ratchet feed cam 31 will cause movement of eccentric feed cam 49 so that the tools will be fed inwardly for the next cut. The dwell portion E of track 61 follows portion D and will blend into the aforementioned portion A.

FIGURE 5 illustrates another workpiece 65 which may be manufactured in accordance with the invention. This workpiece is a gear having crowned or barrel-shaped teeth 66. The manufacture of this gear could be accomplished by a drum cam 67 constructed somewhat similarly to that in the developed view of FIGURE 6. Track 68 of this cam has a first portion F which would cause tools 14 to retract radially outwardly as workpiece 65 moves upwardly, thus creating the first part of the crowned shape. The path of the tool is shown at F' in FIGURE 7. Part f is actually the face cutting part of portion F, the corresponding tool tip path being indicated at f' in FIGURE 7. The second part of the crowned shape would be created by the portion G of cam 67 which would cause tools 14 to be fed radially inwardly at an increasing rate. Portion H of track 68 would cause tools 14 to be retracted and they would remain in this retracted position during the time that follower 43 is in zone I, during which time the workpiece would be retracted downwardly. The portion J of the cam track would cause inward return of tools 14 in readiness for another cut. H', I' and J' in FIGURE 7 designate the corresponding travel paths of a tool tip relative to the descending workpiece.

FIGURE 8 shows a portion of a workpiece 69 which has crowned and tapered teeth 71. To create such a part, a cam similar to that indicated at 72 in FIGURE 9 would be provided. Such a cam would have a track 73 with a first portion K similar to track portions F and G of FIGURE 6, but with the return to the radially inward position of the tools being less than the amount of withdrawal in order to create the tapered effect. The portion L of track 73 will be analogous to portions H, I and J of FIGURE 6 and would provide for retraction of the tools while the workpiece is being retracted, and advancement of the tools to the new cutting position as determined in feed cam 49. FIGURE 10 shows the corresponding paths K' and L' of the tool tip with respect to the workpiece.

It will thus be seen that a variety of workpiece shapes can be formed by the properly correlated movement of tools 14 and ram 16, the movement of the tools being controlled by the particular shape of a drum cam coacting with the wedge type of tool relief actuating mechanism described above.

While it will be apparent that the preferred embodiment of the invention discosed is well calculated to fulfill the objects above stated, it will be appreciated that the invention is susceptible to modification, variation and change without departing from the proper scope or fair meaning of the subjoined claims.

What is claimed is:

1. In a gear forming mechanism of the type having a workpiece reciprocable on its axis through cutting and retracting strokes and radially reciprocable cutting tools, the combination of a sleeve reciprocable coaxially with said gear, means carried by said sleeve and coacting with said cutting tools to feed the cutting tools inwardly when the sleeve moves in one direction and to retract the cutting tools when the sleeve moves in the other direction, a tool relief member reciprocable along a path at right angles to said sleeve, wedge means interconnecting said tool relief member and sleeve whereby movement of said member in one direction will cause inward movement of said tools and movement of said member in the other direction will cause outward movement of said tools, a drum cam, means rotating said drum cam in synchronism with the reciprocating movement of said workpiece, a track on said cam, a follower connected to said tool relief member, and engageable with said cam track, the track having a first portion causing said tools to engage a workpiece at varying depths during a single cutting stroke of said workpiece, a second portion maintaining said tools in retracted position during the retracting stroke of said workpiece, and a third portion returning said tools to their cutting position for the next stroke.

2. The combination according to claim 1, said first track portion having a first part which is arcuate but with no axial component, thereby maintaining the tools at a constant radial distance to form the straight sided portions of teeth, and a second part which has both arcuate and axial components, whereby the tools will be withdrawn outwardly as the workpiece advances to create runout teeth portions thereon.

3. The combination according to claim 1, said first portion of the track having a first part which is arcuate but has an axial component in one direction so as to withdraw the tools outwardly and a second part which is arcuate but has an axial component in the other direction to move the tools inwardly, thereby creating crowned teeth on the workpiece.

4. The combination according to claim 3, the axial component of the first part of said first track portion being different than the axial component of the second part whereby said crowned teeth will also be tapered.

References Cited
UNITED STATES PATENTS

| | | | |
|---|---|---|---|
| 2,374,901 | 5/1945 | Sneed | 90—10 |
| 2,465,707 | 3/1949 | Braun | 90—10 |

GERALD A. DOST, Primary Examiner